United States Patent
Rustad et al.

(10) Patent No.: US 12,460,958 B2
(45) Date of Patent: Nov. 4, 2025

(54) FLOWMETER WITH ATTENUATING RIBBED TRANSDUCER HOUSINGS

(71) Applicant: ONESUBSEA IP UK LIMITED, London (GB)

(72) Inventors: Rolf Rustad, Raadal (NO); Emmanuel Lagrand, Sandsli (NO); Erlend Bjoerndal, Sandsli (NO); Gregor Brown, Edinburgh (GB); Emanuel J. Gottlieb, Pittsburgh, PA (US)

(73) Assignee: ONESUBSEA IP UK LIMITED, London (GB)

( * ) Notice: Subject to any disclaimer, the term of this patent is extended or adjusted under 35 U.S.C. 154(b) by 461 days.

(21) Appl. No.: 18/056,831

(22) Filed: Nov. 18, 2022

(65) Prior Publication Data

US 2023/0082333 A1    Mar. 16, 2023

Related U.S. Application Data

(63) Continuation-in-part of application No. 16/798,479, filed on Feb. 24, 2020, now Pat. No. 12,320,686.

(60) Provisional application No. 62/809,106, filed on Feb. 22, 2019.

(51) Int. Cl.
*G01F 1/667* (2022.01)
*G01F 1/66* (2022.01)

(52) U.S. Cl.
CPC .............. *G01F 1/668* (2013.01); *G01F 1/662* (2013.01); *G01F 1/667* (2013.01)

(58) Field of Classification Search
CPC ........... G01F 1/662; G01F 1/667; G01F 1/668
See application file for complete search history.

(56) References Cited

U.S. PATENT DOCUMENTS

| | | | |
|---|---|---|---|
| 3,906,780 A | 9/1975 | Baldwin |
| 4,532,812 A | 8/1985 | Birchak |
| 4,893,496 A | 1/1990 | Bau |
| 4,949,317 A | 8/1990 | McQuitty |

(Continued)

FOREIGN PATENT DOCUMENTS

| | | |
|---|---|---|
| CN | 102879044 A | 1/2013 |
| CN | 107366532 A | 11/2017 |

(Continued)

OTHER PUBLICATIONS

Folkestad, T. et al., "Paper 17—Operating Experience with two Ultrasonic Gas meters in Series", 21st North Sea Flow Measurement Workshop 2003, 27 pages.

(Continued)

*Primary Examiner* — Jonathan M Dunlap
(74) *Attorney, Agent, or Firm* — Jeffrey D. Frantz

(57) ABSTRACT

A system includes a transducer assembly for a flowmeter. The transducer assembly includes a housing with a front face and at least one attenuating rib. The transducer assembly also includes a transducer positioned in the housing and configured to direct an emitted acoustic signal through the front face of the housing and into a flow path of the flowmeter and to receive a received acoustic signal through the front face of the housing. The system also includes a controller configured to use the received acoustic signal to determine a ratio of a first component versus a second component in a gas flowing through the flow path of the flowmeter.

15 Claims, 6 Drawing Sheets

(56) References Cited

U.S. PATENT DOCUMENTS

| | | | |
|---|---|---|---|
| 5,275,060 | A | 1/1994 | Lynnworth |
| 5,955,677 | A | 9/1999 | Holliday |
| 6,526,838 | B1 | 3/2003 | Froelich |
| 6,837,098 | B2 | 1/2005 | Gysling |
| 7,503,217 | B2 | 3/2009 | Johansen |
| 7,578,203 | B2 | 8/2009 | Andersen |
| 8,225,665 | B2 | 7/2012 | Geir |
| 9,803,976 | B2 | 10/2017 | Simonetti |
| 2008/0084321 | A1 | 4/2008 | Hatch |
| 2008/0306396 | A1 | 12/2008 | Ariav |
| 2011/0080807 | A1 | 4/2011 | Instanes |
| 2012/0048038 | A1 | 3/2012 | Furlong |
| 2012/0125121 | A1 | 5/2012 | Gottlieb |
| 2015/0136842 | A1 | 5/2015 | Allen |
| 2015/0184511 | A1 | 7/2015 | Gordon |
| 2017/0328163 | A1 | 11/2017 | Shirani |
| 2018/0075832 | A1* | 3/2018 | Lin ................. G10K 11/002 |
| 2018/0163528 | A1 | 6/2018 | Smith |
| 2018/0347731 | A1* | 12/2018 | Kesler ............. F16L 19/0286 |
| 2019/0033898 | A1 | 1/2019 | Shah |
| 2020/0033174 | A1 | 1/2020 | Nogueira |
| 2020/0139266 | A1* | 5/2020 | Daasvatn ............. E21B 43/40 |
| 2020/0271493 | A1 | 8/2020 | Lagrand |
| 2020/0284765 | A1 | 9/2020 | Rustad |
| 2024/0035869 | A1* | 2/2024 | Shamrock ............ G01F 15/068 |

FOREIGN PATENT DOCUMENTS

| | | | | |
|---|---|---|---|---|
| EP | 1192457 | B1 | 1/2013 | |
| EP | 3376177 | A1 | 9/2018 | |
| GB | 2372819 | A * | 9/2002 | ........... G01N 33/225 |
| GB | 2399637 | A | 9/2004 | |
| GB | 2431993 | B | 4/2009 | |
| GB | 2457663 | B | 4/2012 | |
| GB | 2537654 | A | 10/2016 | |
| NO | 301948 | B1 | 12/1997 | |
| NO | 20150489 | A1 | 10/2016 | |
| WO | 0072000 | A1 | 11/2000 | |
| WO | WO-02084334 | A1 * | 10/2002 | ............. E21B 49/08 |
| WO | 2004099764 | A1 | 11/2004 | |
| WO | 2005121770 | A1 | 12/2005 | |
| WO | WO-2009083243 | A1 * | 7/2009 | ............. E21B 47/10 |
| WO | WO-2015019081 | A1 * | 2/2015 | ............. E21B 47/00 |

OTHER PUBLICATIONS

Extended Search Report received in European Patent Application No. 20159085.8 dated Jul. 10, 2020, 8 pages.

Extended Search Report received in European Patent Application No. 20159081.7 dated Jul. 15, 2020, 9 pages.

Communication Pursuant to Article 94(3) received in European Patent Application No. 20159081.7 dated Oct. 28, 2021, 6 pages.

Office Action issued in U.S. Appl. No. 16/798,485 dated Mar. 15, 2022, 31 pages.

Office Action issued in U.S. Appl. No. 16/798,485 dated Feb. 26, 2024, 20 pages.

* cited by examiner

FLOWMETER WITH ATTENUATING RIBBED TRANSDUCER HOUSINGS

CROSS-REFERENCE TO RELATED APPLICATIONS

This application is a continuation-in-part of U.S. application Ser. No. 16/798,479, entitled "FLOWMETER WITH ATTENUATING RIBBED TRANSDUCER HOUSINGS" and filed Feb. 24, 2020, which claims priority to and the benefit of U.S. Provisional Application No. 62/809,106, entitled "FLOWMETER WITH RIBBED TRANSDUCER HOUSINGS" and filed Feb. 22, 2019, which are hereby incorporated by reference in their entireties for all purposes.

BACKGROUND

Exploring, drilling and completing hydrocarbon and other wells are generally complicated, time consuming and ultimately very expensive endeavors. This is particularly true in the case of offshore operations where expenses may grow exponentially long after the completion of the well. For example, subsequent routing intervention and maintenance may require considerable more time, effort and cost at the subsea oilfield.

In recognition of these potentially enormous expenses, added emphasis has been placed on well monitoring and maintenance throughout the life of the well. That is, placing added emphasis on increasing the life and productivity of a given well may help ensure that the well provides a healthy return on the significant investment involved in its completion. So, for example, it may be of benefit to cost effectively monitor well conditions such as pressure, temperature, or production fluid flow with an accurate flowmeter and in real-time where possible. Of course, what is cost effective may depend on the circumstances.

For flowmeters utilized at a land-based "topside" oilfield, the monitoring of single-phase production fluids may be effectively tracked with permanently installed ultrasonic flowmeters in production tubing or other locations where production fluids are channeled. Regardless, like other equipment, these flowmeters are more readily accessible than flowmeters utilized in the subsea environment, even if located at or below a wellhead. As a result, such ultrasonic flowmeters may be designed in a way that allows for cost-effective replacement many times over the course of the life of the well.

Topside ultrasonic flowmeter designs may take into account the practical advantage of replicability. For example, the ultrasonic transducer of such a flowmeter includes a piezo-electric element that is prone to generate noise which could be transmitted through a flowmeter body to a receiving transducer and affect accuracy of flow readings. However, this issue may be addressed by decoupling housing components acoustically from the flowmeter body by inserting nitrile or polymer-based, sealed O-rings and spacers which can serve to dampen or interrupt the propagation of such noise. These features tend to break down over time in the harsh, high temperature oilfield environment, for example, after years of exposure to continuously flowing production fluids. Nevertheless, as noted above, it remains cost effective to replace such flowmeter components periodically, perhaps on a predetermined basis, such as every two to five years, by way of example.

Unfortunately, replacing topside flowmeter components due to the intentional use of dampening features that are prone to fail still introduces added costs to operations. Furthermore, this cost is no longer practical when the circumstances are changed to the subsea environment. In the subsea environment regular change-out of equipment such as pumps and flowmeters is not just costly but, generally speaking, entirely impractical. These types of change-outs may introduce delay and expenses ranging in the millions in today's dollars. As a result, suitable equipment for this environment is generally rated at twenty to thirty years operating time or more. The possibility of a predetermined change-out of subsea ultrasonic flowmeter components every two to five years is simply not a practical option. Therefore, the disadvantage of requiring a periodic change-out of topside ultrasonic flowmeter components turns into the reality of completely unavailable subsea ultrasonic flowmeters.

Ultimately, given the impracticality of ultrasonic flowmeters for subsea use, operators are left with a variety of disadvantageous options. Venturi flowmeters that introduce an undesirable pressure drop, complex and expensive multiphase flowmeters and other options are available. However, these types of flowmeters come with added equipment expense and/or a functionality that is not directed at high accuracy measurement of single-phase fluid flows. As a practical matter, the option of a subsea ultrasonic flowmeter for long term installation and use remains unavailable.

SUMMARY

A flowmeter design is detailed that utilizes a unique transducer assembly. The assembly includes a transmitter in a housing. The transmitter is configured to direct acoustic signal past a wall of the transmitter housing and toward an adjacent flow path. The assembly also includes at least one attenuating rib that is physically coupled to the housing at a location opposite that of the flow path.

DETAILED DESCRIPTION

In the following description, numerous details are set forth to provide an understanding of the present disclosure. However, it will be understood by those skilled in the art that the embodiments described may be practiced without these particular details. Further, numerous variations or modifications may be employed which remain contemplated by the embodiments as specifically described.

Embodiments are described with reference to certain types of downhole hydrocarbon recovery operations. In particular, focus is drawn to flowmeters and techniques applied to permanent subsea (e.g., subsea or offshore) installations for long term flow monitoring. However, tools and techniques detailed herein may be employed in a variety of other manners. For example, embodiments of flowmeters as detailed herein may be configured for use "topside" at a surface-based oilfield. Indeed, such flowmeters may even be employed outside of the oilfield environment altogether. Regardless, so long as a flowmeter incorporates a rib attenuating transducer assembly, appreciable benefit may be realized.

As discussed in more detail herein, the flowmeters may be employed to measure a flow rate of a fluid (e.g., gases) flowing through the flowmeters and/or to facilitate determination of a ratio of a first component versus a second component (e.g., a ratio of a respective concentration of the first component versus a respective concentration of the second component) in the fluid (e.g., binary gases formed entirely or substantially of the first component and the second component) flowing through the flowmeters.

Figure 1:
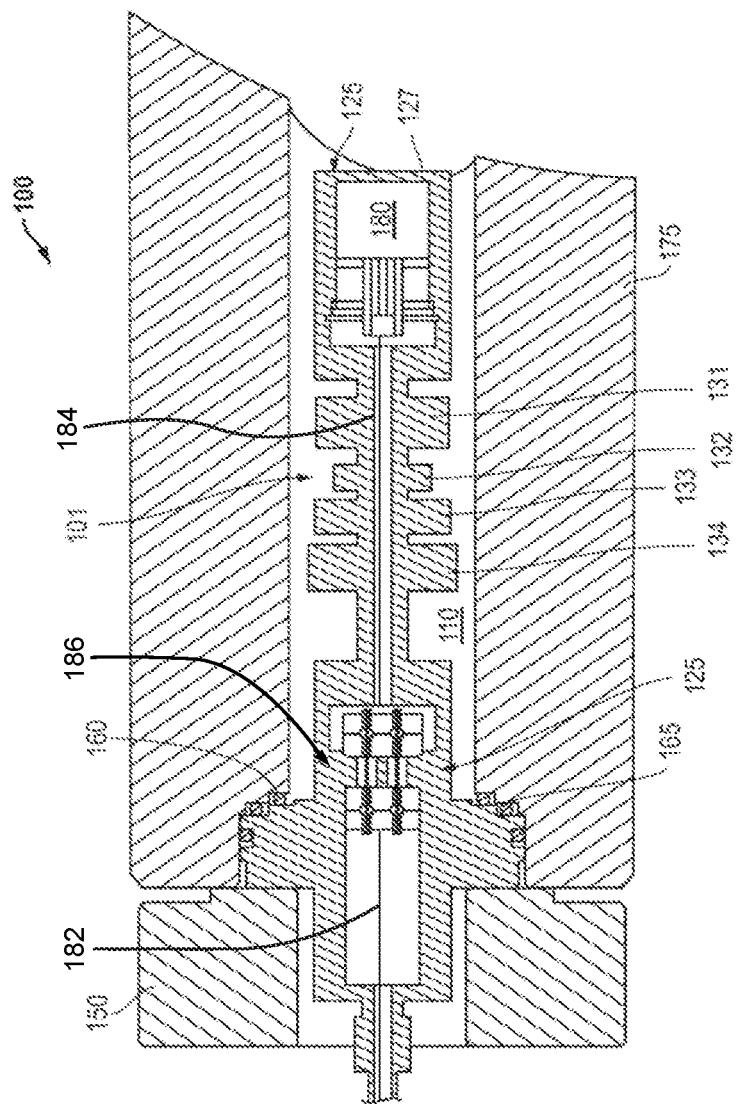
FIG. 1 is a side cross-sectional view of an embodiment of a rib attenuating transducer assembly for a flowmeter.

Referring now to FIG. 1, a side cross-sectional view of an embodiment of a rib attenuating transducer assembly 100 is shown. With added reference to FIGS. 2 and 4, the assembly 100 is configured for incorporation into a flowmeter 200. Ultimately, this flowmeter 200, equipped with a plurality of rib attenuating transducer assemblies, may be particularly well suited for subsea use such as at the oilfield 400 of FIG. 4. However, there may also be distinct advantages to utilizing such a flowmeter 200 at surface or within a well, regardless of whether or not the associated wellhead is at a seabed or on land. Additionally, as discussed in more detail herein, there may also be distinct advantages to utilizing such a flowmeter 200 in conjunction with a well for injection and/or storage of carbon dioxide ($CO_2$) and $CO_2$ rich gas.

Continuing with reference to FIG. 1, the transducer assembly 100 includes a transducer 180 that is disposed within a transducer housing 125. In the embodiment shown, the transducer 180 is outfitted with a piezo-electric device or other suitable element for operating at ultrasonic frequencies. Thus, the assembly 100 is well suited for supporting flowmeters directed at detecting (e.g., measuring) single phase fluid flows. More specifically, as detailed further below, the depicted transducer assembly 100 may pair up with an adjacent transducer assembly 201 of the flowmeter 200 shown in FIG. 2 to cooperatively detect a flowing fluid.

Figure 2:
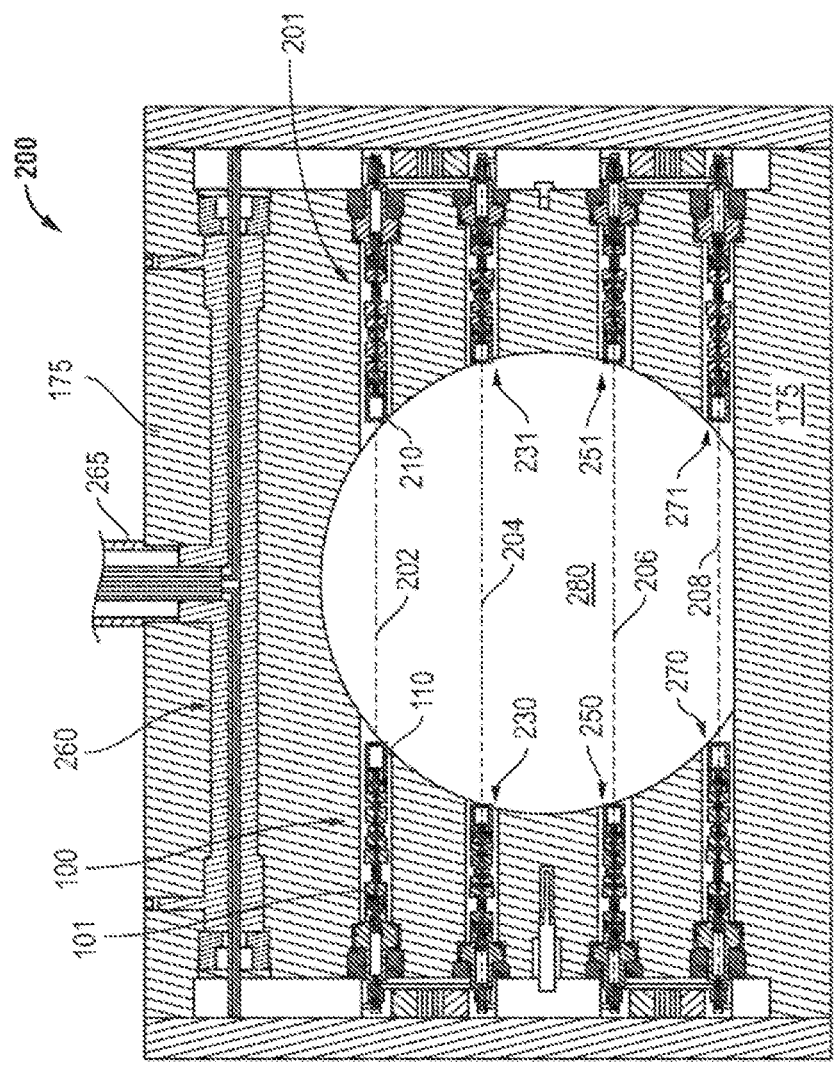
FIG. 2 is a side cross-sectional view of a flowmeter incorporating the transducer assembly of FIG. 1.

With added reference to FIG. 2, this detection of fluid flow velocity includes a conventional mode of the transducer 180 detecting known acoustic frequencies from the adjacent assembly 201 with fluid flow interference being an indicator of fluid velocity. As indicated above, these frequencies may be ultrasonic, perhaps in the 10 kHz-5 MHz range, 10 kHz-3 MHz range, 10 kHz-MHz range, 10 kHz-1 MHz range, 100 kHz-MHz range, 100-500 kHz, 100-300 kHz range, 100-200 kHz range, 100-150 kHz range, or any other suitable frequency range. Of course, while the transducer 180 is making such detections, it is also emitting the same frequencies toward the adjacent assembly 201. With specific reference to the illustration shown in FIG. 1, this means that ultrasonic transmissions that are directed from the transducer 180 and toward the adjacent flow path 280 of FIG. 2, first cross the physical front face 127 of the housing 125.

While the described transmissions may serve to help determine fluid flow velocity as noted, they also result in vibrational noise as they cross the structure of the housing 125. That is, vibrations in the housing 125 which result from the ultrasonic transmissions from the transducer 180 toward the flow path 280 of FIG. 2 are not an indicator of fluid velocity. Rather, they are mere noise from the transducer 180 itself. However, this "noise" is not necessarily readily distinguishable as noise. That is, while detections by the transducer 180 from the adjacent assembly 201 of FIG. 2 are intended to provide fluid velocity information, the described "noise" is not meant as such and may skew accuracy if factored into the analyzed data. That is, as ultrasonic or other acoustic frequencies are received by the assembly 100, they may propagate from the location of the transducer 180 toward a flange 150 that supports and/or contacts the housing 125, as shown. This has the potential to create noise issues because it is only the ultrasonic frequency from the adjacent assembly 201 and that is transmitted through the flowing fluid that is meant to be factored into such analysis. Other frequency information which results from vibrational "noise" propagating along the housing 125 from the location of the transducer 180 as described could skew the analysis.

To substantially eliminate the possibility of the described "noise" from reaching the flange 150 and compromising accuracy of the noted analysis, the housing 125 of FIG. 1 includes a ribbed profile 101. In the embodiment shown, this ribbed profile 101 is located between the main front of the housing 125 and the flange 150. In this way a plurality of ribs 131, 132, 133, 134 may serve to filter out or attenuate vibrational noise that emerges mainly from the location at the front face 127 of the housing 125. As detailed further below, substantially preventing this noise from reaching the flange 150 means that the data (e.g., signals) which does reach the flange 150, such as via conductors 182 (e.g., wires) that extend from the transducer 80, through an interior channel 184 within the housing 125, through a feedthrough 186 portion, and through the flange 150 for processing, as shown, is limited to the intended indicator of fluid flow velocity detected by the transducer 180 from the opposite assembly 201 (see FIG. 2).

In the embodiment shown, the ribbed profile 101 includes four ribs 131, 132, 133, 134. However, pluralities of different numbers of ribs may be utilized, including the use of a single rib. As detailed further below, the exact number, profile and size of each rib may be determined through modeling and experimental verification, accounting for factors such as the frequencies to be expected and the dimensions of the overall housing 125 and assembly 100 as well as the materials utilized. As shown, the interior channel 184 of the housing 125 extends axially (e.g., along an axial axis from the front face 127 toward the flange 150), and the one or more ribs may be annular structures that extend circumferentially about the interior channel 184 of the housing 125; however, as noted herein, the one or more ribs of the ribbed profile 101 may have any of a variety of suitable structures.

For example, in the embodiment shown, the overall assembly 100 depicted may be 10-15 cm long from the front face 127 of the housing 125 to the flange 150. The transducer 180 may be configured to operate in the 10 kHz-5 MHz range or any other suitable range, perhaps tailored toward gas flow rate detection (e.g., measurement). The housing 125 may be a metal-based material suitable for long term exposure to subsea conditions with the front portion 127 of the housing 125 having a diameter of 5-50 millimeters (mm), 10-40 mm, or 20-25 mm, for example. Modeling for rib dimensions in this embodiment may take into account such sizing, frequencies and materials with a focus on attenuating noise traveling from the front portion 127 toward the flange 150 before reaching the flange 150. So, for example, in such a circumstance, the ribs 131, 132, 133, 134 may range in diameter from 10-25 mm with a width of between 1 mm and 5 mm between the ribs 131, 132, 133, 134 and/or between the first rib 131 and the front portion 127 of the housing 125.

Of course, these frequencies, materials, dimensions and other depicted aspects of the rib profile 101 are for illustrative purposes only. In many cases it may be useful that the first rib 131 be of a size and morphology for attenuating a majority of the described noise. In many cases it may be effective that the first rib 131 and the last rib 134 be the largest of the ribs in overall structural volume. Of course, this is not required. Additionally, the more effective rib geometries may change as operational parameters change. For example, the embodiment shown is tailored toward gas flow detection as indicated above. However, where the assembly 100 is expected to be utilized more for liquid phase detection, transducer frequencies may be over 1 MHz with the ribs 131, 132, 133, 134 being smaller and thinner than the dimensions noted above.

As discussed in more detail herein, the transducer 180 may be configured to operate in a frequency range, such as the 10 kHz-5 MHz range or any other suitable frequency range, that facilitates detection of a flow rate of the gases flowing by the assembly 100 and/or determination of a ratio of a first component versus a second component (e.g., a ratio of a respective concentration of the first component versus a respective concentration of the second component) in the gases (e.g., binary gases formed entirely or substantially of the first component and the second component) flowing by the assembly 100. It is presently recognized that a measurement of the flow rate of the gases may be more accurate at relatively higher frequency acoustic signals as compared to relatively lower frequency acoustic signals (e.g., higher and lower within the range of 10 kHz-5 MHz or any range disclosed herein). Further, it is presently recognized that certain components in the gases, such as $CO_2$, may attenuate the relatively higher frequency acoustic signals more than the relatively lower frequency acoustic signals. Accordingly, when the transducer 180 is used to detect such components in the gases, it may be desirable to operate the transducer 180 in a particular relatively lower frequency range, such as 100-150 kHz. In this way, the transducer 180 may provide sufficient accuracy with respect to the flow rate, as well as any ratio of such components in the gases. For example, the transducer 180 may be configured to operate in a particular relatively lower frequency range, such as 100-150 kHz, to enable accurate and reliable determination of the flow rate of the gases and/or a ratio of $CO_2$ versus hydrocarbons in gases flowing by the assembly 100. In any case, the ribbed profile 101 (e.g., the number and the size of the rib(s)) may be designed to attenuate energy generated in an operable frequency range of the transducer 180. For example, the ribbed profile 101 (e.g., the number and the size of the rib(s)) for use with the transducer 180 that is configured to operate in the particular relatively lower frequency range may be designed to attenuate energy generated in the particular relatively lower frequency range to thereby facilitate the measurement of the flow rate in gases flowing by the assembly 100 and/or the ratio of $CO_2$ versus hydrocarbons in gases flowing by the assembly 100.

This may enable manufacturers to manufacture and provide a kit or a set of various assemblies 100 with different specifications, including different frequency ranges and corresponding different ribbed profiles 101. For example, the kit or the set may include a first assembly with a first ribbed profile and that is designed to facilitate noise reduction and operation in a first frequency range to facilitate detection of a flow rate of gases and a ratio of the first component versus the second component in the gases, wherein the first component is $CO_2$; a second assembly that is designed to facilitate noise reduction and operation in a second frequency range to facilitate detection of a flow rate of gases and a ratio of a third component versus a fourth component in the gases, wherein neither the third component nor the fourth component is $CO_2$; a third assembly that is designed to facilitate noise reduction and in a third frequency range to facilitate detection of a flow rate of liquid and a ratio of any two components in the liquid; and so forth. Then, depending on operating parameters and desired measurements for particular subsea operations, an operator may select at least one type of assembly of the various assemblies 100 for use in at least one flowmeter 200 in the subsea environment. Indeed, the operator may even select multiple different assemblies of the various assemblies 100 for use in one or more flowmeters 200 in the subsea environment. For example, one flowmeter 200 may include multiple first assemblies with the first ribbed profile to detect the first component, such as $CO_2$, and/or a ratio thereof, while another flowmeter 200 may include multiple second assemblies with the third ribbed profile to detect another component, other than $CO_2$, and/or a ratio thereof; and so forth. In this way, a manufacturer may enable the operator to efficiently select certain assemblies 100 manufactured by the manufacturer (e.g., from a product catalog) to effectively customize their flowmeters 200 for a particular well site, specifications, desired component detection, desired component ratios, accuracy in flow rates, accuracy in ratios, and so forth.

Continuing with reference to FIG. 1 with added reference to FIG. 2, the monolithic housing 125 of the assembly 100 is secured within the flowmeter body 175 by the flange 150 at one end and metal to metal seals 160, 165 (e.g., closed loop metal seal element; annular metal seal elements that form annular seals; metal or metal alloy material) which serve as first and second level pressure barriers. Alternatively, welding, brazing, and/or any other suitable technique to form a seal joint may be utilized. Regardless, the housing 125 suspends the transducer 180 in a channel 110 of the flowmeter 200 that is exposed to the flow path 280 in a unique manner. Namely, this means that the assembly 100 takes on a monolithic form in a way that also facilitates the attenuation of noise without the introduction of threading components, nitrile material, polymeric O-rings, seals, spacers or other features that would be subject to a higher rate of deterioration and failure in an oilfield environment whether subsea or topside (e.g., the assembly 100 is devoid of threading components, nitrile material, polymeric O-rings, seals, spacers; only metal seals, such as metal seals 160, 165, provide seals between the flowmeter body 175 and the housing 125; metal seals 160, 165, welds, and/or brazed joints, provide seals between the flowmeter body 175 and the housing 125). Thus, an ultrasonic transducer assembly 100 and flowmeter 200 are provided that may be suitable for continuous oilfield use for an extended period. For example, embodiments such as that depicted may be rated for effective continuous use over a twenty to thirty year period without need for replacement.

Referring specifically now to FIG. 2, a side cross-sectional view of a flowmeter 200 is shown that incorporates the transducer assembly 100 of FIG. 1. In this depiction, the manner in which this assembly 100 works cooperatively with a transducer assembly 201 at the opposite side of the flow path 280 is apparent. Specifically, a transmission path 202 between the two is shown. Transmissions from one assembly 201 to the other 100 may be detected at the transducer 180 and directed toward the flange 150 as described above. However, more notably, as also described above, these detected transmissions which may provide the sought after flow rate information from the flow path 280 may be analyzed without any material noise interference from a vibrating housing 125 (see FIG. 1). Once more this is achieved without the need for intervening nitrile or polymer-based features due to the rib profile 101 of the assembly 100.

Continuing with reference to FIG. 2, the described substantially noise-free analysis that is facilitated by the unique geometry of the transducer assembly 100 of the first channel 110 is repeated not only at the opposite paired assembly 201 but on several different levels of the flowmeter 200. That is, the second channel 210 accommodates the paired assembly 201 as described with each of these first two assemblies 100, 201 operating off of the same transmission path 202. However, in the embodiment shown, this manner of transmission and detection is repeated fourfold with three other transmission paths 204, 206, 208. Once more each path 204, 206, 208 supports a shared pair of assemblies disposed in channels at opposite sides of the flow path 280. Specifically, channels 230 and 231 cooperate at path 204, channels 250, 251 at path 206 and channels 270, 271 at path 208. In each circumstance, the assemblies include a monolithic housing and ribbed profile such as that detailed in FIG. 1. Thus, eight different detections are supported which combine to translate into substantially noise-free analysis of the flow rate of fluid through the flow path 280. Further, in some embodiments, the detections provide substantially noise-free analysis of aspects related to a composition of the fluid, such as a ratio of $CO_2$ versus hydrocarbon gases in the fluid.

In the embodiment shown, the data obtained may be combined or separately routed through electronics packaging (e.g., wires), such as electronics packaging 260. Ultimately, the data may be analyzed and periodically routed away from the flowmeter 200 through a conduit 265 for surface review. However, the data collected in this manner remains substantially free of noise that might compromise the accuracy of the determined flow rate of fluid through the flow path 280 and/or the ratio of the first component versus the second component in the fluid within the flow path 280.

Figure 3A:
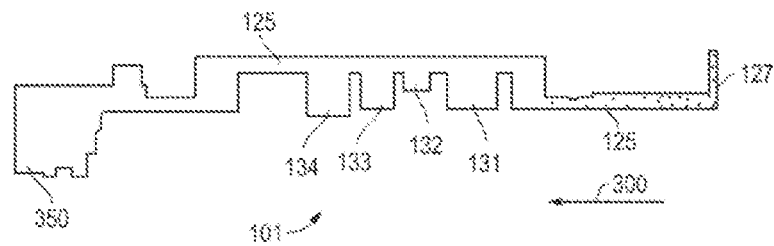
FIG. 3A is a side schematic view of a profile portion of the transducer of FIG. 1 at given point in time following activation of a transducer of the assembly.
Figure 3B:
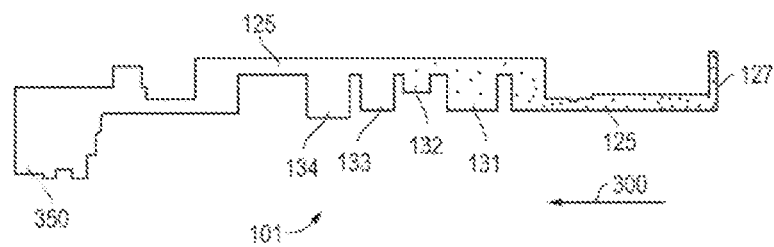
FIG. 3B is a side schematic view of the profile portion of the transducer at a later point in time after the given point in time of FIG. 3A.
Figure 3C:
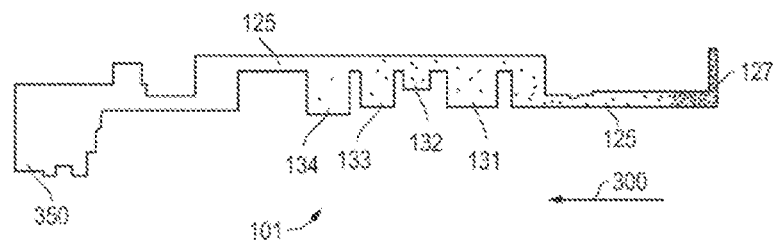
FIG. 3C is a side schematic view of the profile portion of the transducer at a last point in time after the later point in time of FIG. 3B.

Referring to FIGS. 3A-3C, side schematic view of a profile portion of the transducer housing 125 is shown as noise, illustrated in the form of stippling, propagates from the front face 127 to a rear portion 350 of the housing 125 (see arrow 300). More specifically, with added reference to FIG. 1, FIG. 3A depicts the housing 125 at a first point in time following activation of the transducer 180. At the outset, a minor amount of vibrating noise is apparent at the portion of the housing 125 closest to the transducer 180 (e.g., at the front face 127).

Continuing with reference to FIG. 3B, a side schematic view of the profile portion of the transducer housing 125 is shown at a later point in time after the given point in time of FIG. 3A. At this time, a greater amount of noise is apparent in the front portion of the housing 125. Additionally, noise is beginning to reach the first rib 131 and slightly beyond.

FIG. 3C is another side schematic view of the profile portion of the transducer housing 125. However, at this last depicted point in time, the propagation of the noise has changed. Specifically, notice that in terms of the overall rib profile 101, the majority of the illustrated stippling or noise fails to propagate beyond the first rib 131. That is, even though some degree of noise has made it all the way to the last rib 134, most of the noise stops propagating upon encountering the first rib 131. Once more the next supplemental ribs 132, 133, capture most of the remaining noise such that very little is left to reach the last rib 134 or beyond. In the embodiment shown, a negligible amount of noise reaches beyond the last rib 134 headed toward the rear portion 350 of the housing 125. Indeed, a portion of this noise may even reach the flange 150 (see FIG. 1). However, the amount of noise that ultimately factors into detected analysis is so minor that flow rate analysis is not significantly compromised.

Continuing with reference to FIGS. 3A-3B, the particular rib profile 101 depicted may be established based on a variety of optimization techniques including transient analysis with recorded results in advance of employing an assembly 100 (see FIG. 1). Additionally, the profile 101 refers to the attenuating projections as ribs 131, 132, 133, 134 due to the resulting appearance. However, the term "ribs" is not meant to infer any particular morphology or shape. Following different optimization runs, accounting for various operational parameters, a variety of differently shaped projections may emerge as suitable for dampening of the noise as described herein. This may even include the use of ribs which extend inward relative the housing 125 and not just outward as shown herein. Indeed, both internal and external "ribs" may be used in the same housing 125 and even at the same axial location of the same housing 125.

Figure 4:
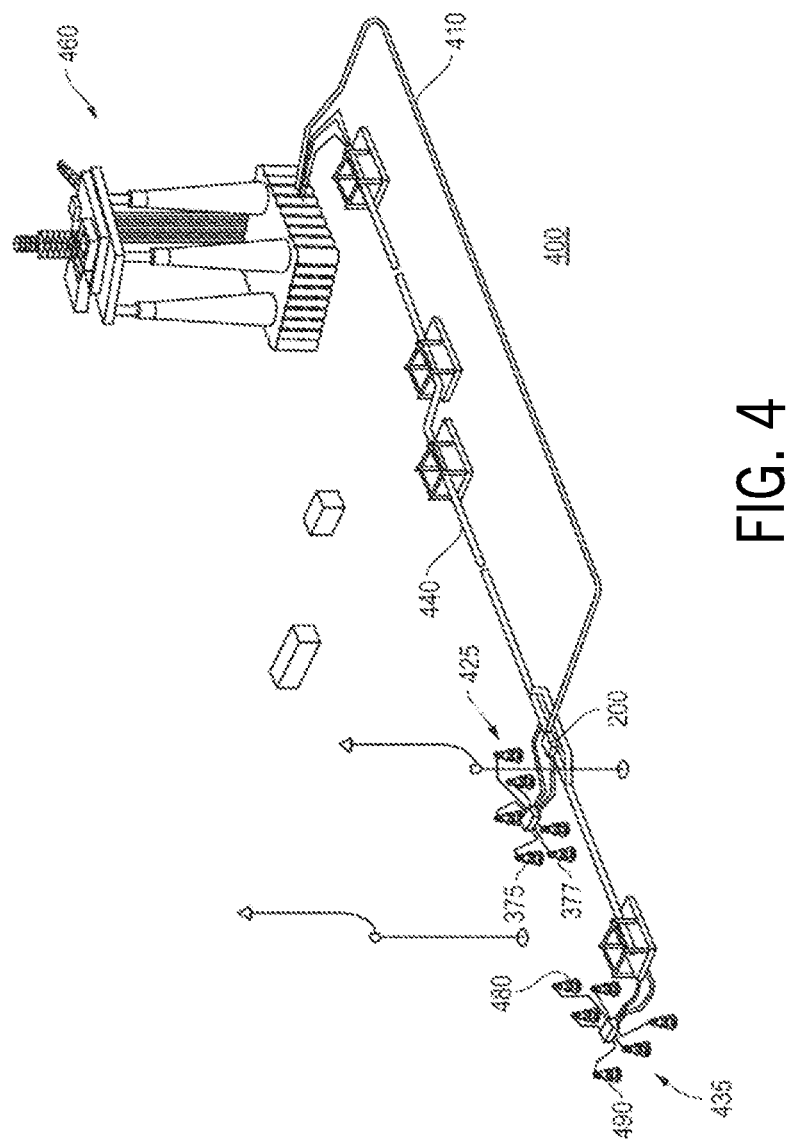
FIG. 4 is an overview depiction of a subsea oilfield employing the flowmeter of FIG. 2.

Referring now to FIG. 4, an overview depiction of a subsea oilfield 400 is shown employing the flowmeter 200 of FIG. 2. In this particular layout, multiple well clusters 425, 435 including subsea trees 375, 377, 480, 490 are shown for obtaining and routing production fluids through installed pipelines 410, 440, eventually leading to an offshore platform 460 for collection. Operations may be directed from the platform 460 and aided by a real time display of production flow rate.

Figure 6:
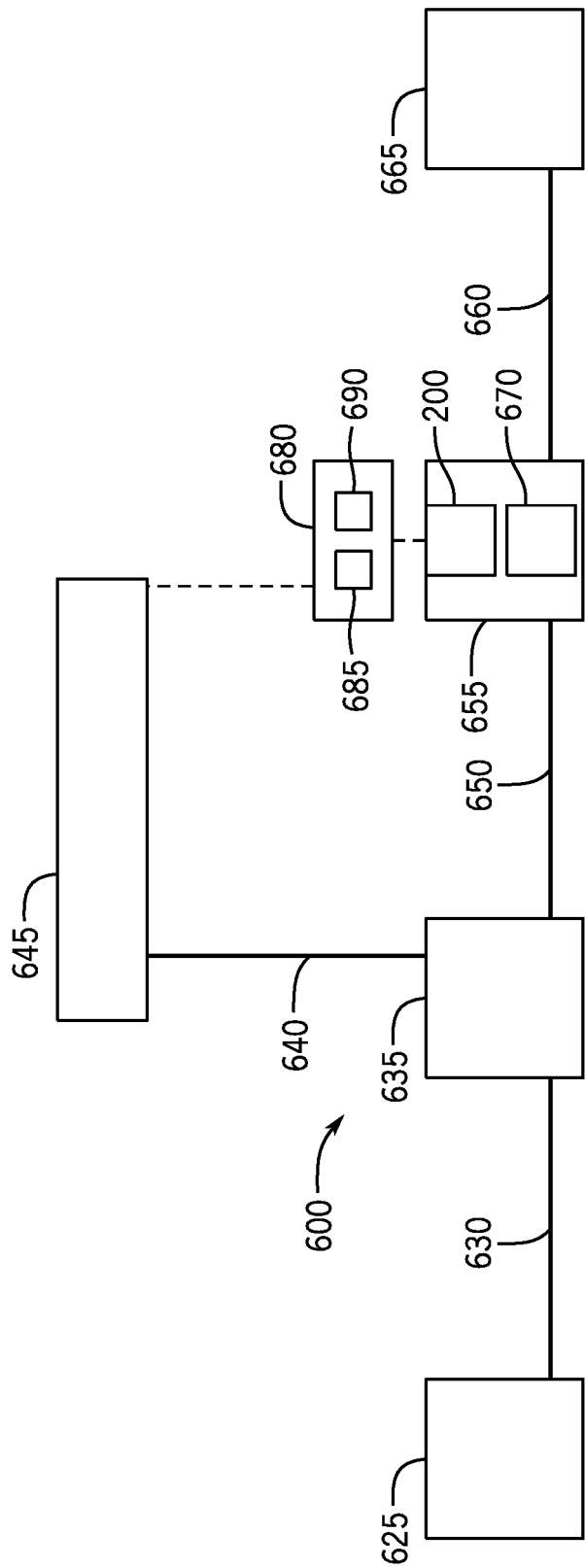
FIG. 6 is an overview depiction of a subsea oilfield employing the flowmeter of FIG. 2 between a separation station and an injection well.

Referring now to FIG. 6, in some embodiments, a subsea oilfield 600 may include additional or alternative features. For example, a well cluster or well 625 may be coupled, such as via pipelines 630, to a separation station 635 located at a sea floor. The separation station 635 receives fluids from the well cluster or well 625 and separates a liquid export from gases (e.g., binary gases; hydrocarbon gases and $CO_2$). The liquid export is delivered, such as via pipelines 640, to a surface structure 645 (e.g., to an offshore platform or a floating production storage and offloading (FPSO]) unit for further processing and usage. The gases may be delivered, such as via pipelines 650, to an injection station 655 located at the sea floor. Then, the gases may be delivered, such as via pipelines 660, to an injection well 665 located at the sea floor. The injection well 665 injects the gases below the sea floor (e.g., into a formation). The flowmeter 200 may be located downstream of the separation station 635 and upstream of the injection well 665 (e.g., between the separation station 635 and the injection well 665 along a direction of flow of the gases). In some embodiments, the flowmeter 200 may be supported at the injection station 655 downstream or upstream of a pump 670 that pumps the gases at high pressure through the injection well 665 to return the gases below the sea floor.

Notably, the gases may contain large amounts of $CO_2$ and/or may be formed entirely or substantially of $CO_2$ and hydrocarbons. It is presently recognized that it may be desirable to monitor a ratio of $CO_2$ versus hydrocarbon gases in the gases over time. Further, a controller 680 (e.g., an electronic controller; subsea) may determine the ratio of $CO_2$ versus hydrocarbon gases in the gases over time and monitor trends in the ratio of $CO_2$ versus hydrocarbon gases in the gases over time. This may indicate certain operational features and inform various operational decisions. For example, an increase in the ratio of $CO_2$ versus hydrocarbon gases in the gases over time may indicate that the injection well is positioned too closely to the production well (e.g., the well clusters or well 625 that is the source of the gases being measured by the flowmeter 200; the injection site has combined with or reached the production site in the formation). As another example, a decrease in the ratio of $CO_2$ versus the hydrocarbon gases in the gases over time may indicate that maintenance operations should be conducted for the separation station 635 as the separation station 635 is no longer properly separating the liquid from the gases. This may also be informed or corroborated via other measurements of the liquid export. It should be appreciated that the ratio may be calculated or inferred based on travel (e.g., speed of sound or time of travel) of the acoustic waves through the gases (e.g., using one or more algorithms or look-up tables that relate the speed of sound or time of travel to the ratio). In particular, the speed of sound through the gases varies with the fluid density (e.g., gas density; average molecular weight of the binary gas or gas mixture), as well as the temperature and the pressure of the fluid. The temperature and the pressure of the fluid may be measured by other sensors (e.g., temperature sensors, pressure sensors). Thus, knowing the pressure and temperature of the fluid, the ratio may be determined based on the speed of sound through the gases (e.g., using one or more algorithms or look-up tables that relate the speed of sound to the ratio).

It should be appreciated that the ratio of $CO_2$ versus the hydrocarbon gases and/or the trends in the ratio of $CO_2$ versus the hydrocarbon gases over time may be communicated to and displayed on a display screen, which may be located at the surface structure 645 or any suitable location, for visualization by an operator. Further, alerts (e.g., audible and/or visual alerts) may be the provided based on the ratio of $CO_2$ versus hydrocarbon gases and the trends in the ratio of $CO_2$ versus hydrocarbon gases over time. For example, an audible alert via a speaker and/or a text message alert via the display screen may be triggered and provided in response to the ratio exceeding a respective threshold (e.g., a ratio threshold) and/or in response to a change in the ratio over time exceeding a respective threshold (e.g., a change threshold; a rate threshold). It should be appreciated that any of a variety of outputs, including numerical data, graphical data, and/or alerts, may be presented to notify the operator of parameters detected by the flowmeter 200. Additionally or alternatively, the controller 680 may provide control signals (e.g., to actuate a valve) in response to the ratio exceeding a respective threshold and/or in response to the change in the ratio over time exceeding a respective threshold.

Further, it should be appreciated that the gases may include any of a variety of components, such as hydrogen sulfide, nitrogen, natural gas, water vapor, and/or $CO_2$. Thus, the flowmeter 200 and the techniques disclosed herein may be utilized to determine a ratio any of two of such components, such as any two of hydrocarbon gases (e.g., methane, ethane, propane and so forth), hydrogen sulfide, nitrogen, natural gas, water vapor, and/or $CO_2$. Further, the controller 680 may calculate the ratio, monitor the trends in the ratio over time, provide appropriate outputs (e.g., on the display screen), and so forth.

The controller 680 may include a processor 685 and a memory device 690. In some embodiments, the controller 680 may be located subsea, such as within in a structure supported on the sea floor. In some cases, the controller 680 may be communicatively coupled to other devices/systems and/or may operate as part of a distributed control system including components located at the wellsite, a nearby control site, a remote site, subsea, the surface, or any combination thereof. The processor 685 may include one or more processors that are used to execute software, such as software for coordinating operation of the transducer assemblies 100, processing signals from the transducer assemblies 100, and so forth. Moreover, the processor 685 may include one or more microprocessors, one or more "general-purpose" microprocessors, one or more special-purpose microprocessors, and/or one or more application specific integrated circuits (ASICs), or any combination thereof. For example, the processor 685 may include one or more reduced instruction set computer (RISC) processors. The memory device 690 may include a volatile memory, such as random access memory (RAM), and/or a nonvolatile memory, such as read-only memory (ROM) or a flash memory. The memory device 690 may store a variety of information and may be used for various purposes. For example, the memory device 690 may store processor-executable instructions (e.g., firmware or software) for the processor 685 to execute, such as instructions for coordinating operation of the transducer assemblies 100, processing signals from the transducer assemblies 100, and so forth. The memory device 690 may include a storage device (e.g., nonvolatile storage), such as ROM, flash memory, a hard drive, or any other suitable optical, magnetic, or solid-state storage medium, or any combination thereof. The storage device may store data, such as look-up tables, for example.

As noted, the controller 680 may be communicatively coupled to other devices/systems. For example, the controller 680 may be communicatively coupled to the display screen, an input device (e.g., button, switch), a speaker, a light emitter, a communication device, or the like. The display screen may display information for visualization by the operator. The input device may enable the operator to provide inputs to the controller 680. It should be appreciated that the display screen may be a touchscreen display, and thus, the display screen may also operate as the input device. When present, the speaker may output audible alerts, the light emitter may output light indicators, and the communication device may facilitate the communication with the other devices/systems.

As indicated above, a flowmeter 200 employing ribbed transducers may be uniquely beneficial to such operations. Not only is a simple, largely monolithic geometry provided, but an assembly that may be installed and left for twenty to thirty years or longer without need of change-out is provided. This is beneficial in any environment (e.g., subsea and/or surface), but particularly in the subsea environment where such a change-out can be exorbitantly expensive.

Figure 5:
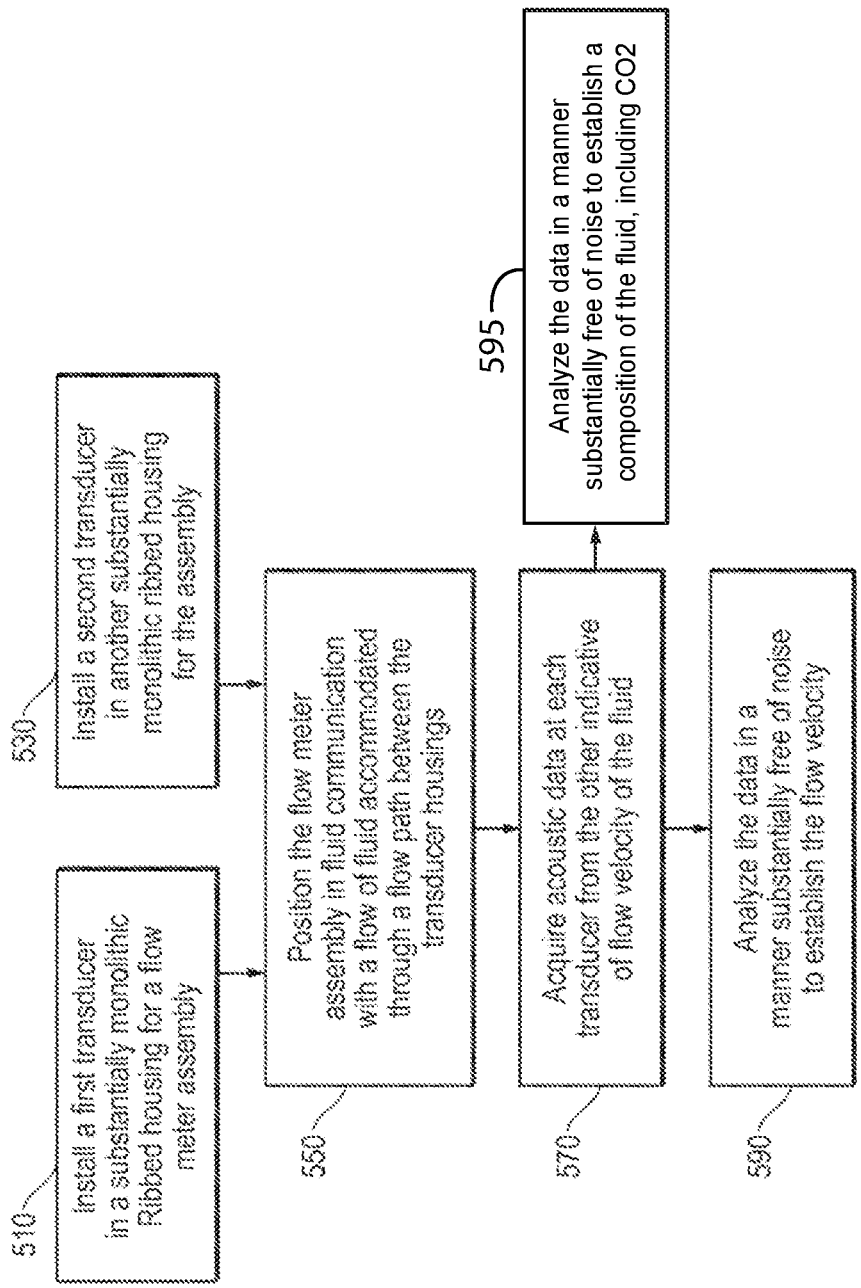
FIG. 5 is a flow-chart summarizing an embodiment of employing the flowmeter of FIG. 2.

Referring now to FIG. 5 is a flow-chart summarizing an embodiment of assembling and employing the flowmeter of FIG. 2. As illustrated, first and second transducer assemblies are put together employing substantially monolithic ribbed housings as indicated at 510 and 530. Thus, once assembled, a flowmeter which utilizes these types of transducer assemblies may be positioned in communication with a flow of fluid that is to be detected and analyzed for velocity (see 550). Specifically as indicated at 570, acoustic data such as ultrasonic data may be emitted by each transducer with each acquiring data from the other which has been affected by the flow of fluid. However, most notably, due to the unique ribbed housings as detailed herein, the acquired data may be transmitted for analysis in a manner that is substantially free of noise that might otherwise affect the accuracy of the determined flow velocity (see 590).

As noted herein, the flowmeter may be utilized to measure aspects related to a composition of the fluid, including a ratio of a first component versus a second component in gases, such as in gases separated from production fluid for injection back into the formation (see 595). For example, the gases separated from the production fluid in this way may be formed entirely or substantially of $CO_2$ and hydrocarbons, and the ratio of $CO_2$ versus hydrocarbons may be calculated or inferred based on travel (e.g., speed of sound or time of travel) of the acoustic waves through the gases (e.g., using one or more algorithms or look-up tables that relate the speed of sound or time of travel to a fluid density of the gases and a corresponding ratio of the first component versus the second component in the gases).

Further, it should be appreciated that the component(s) may include any two of hydrocarbon gases, hydrogen sulfide, nitrogen, natural gas, water vapor, and/or $CO_2$. However, the techniques disclosed herein may be particularly useful (e.g., efficient, accurate) to measure the ratio of $CO_2$ versus hydrocarbons (e.g., methane) because these two components have a relatively large difference in molecular weight. As such, fluid density (e.g., gas density of the binary gas formed form $CO_2$ and hydrocarbons) varies substantially based on the ratio of $CO_2$ versus hydrocarbons, and thus the speed of sound through the fluid varies substantially in a manner that facilitates determination of the ratio (e.g., using one or more algorithms or look-up tables that relate the speed of sound to the ratio).

Further, the frequencies of acoustic waves emitted by the first and second transducer assemblies may be selected to facilitate accurate measurement of the flow rate of the fluid, as well as the aspects related to the composition of the fluid (e.g., balanced to be high enough for accurate measurement of the flow rate of the fluid, but low enough to reduce attenuation due to presence of certain components, such as $CO_2$). The frequencies of the acoustic waves may be between about 10 kHz-5 MHz, or any other suitable frequency range, including any frequency range disclosed herein. Additionally, the ribbed profile of respective housings of the first and second transducer assemblies may be specifically selected and designed to attenuate energy during operation at the frequencies. Indeed, multiple different flowmeters with multiple different types of transducer assemblies (e.g., different ribbed profiles and frequencies) may be positioned at various locations in a subsea environment to efficiently and accurately measure various different types of fluids and/or various different components within the fluids. Further, it should be appreciated that even one flowmeter may include multiple different types of transducer assemblies (e.g., different ribbed profiles and frequencies) to efficiently and accurately measure various different types of fluids and/or various different components (e.g., a ratio of respective concentrations of different components) within the fluids.

An additional advantage is that the flowmeter disclosed herein provides a volumetric flow rate of the fluid, whereas it may be desirable to calculate a mass flow rate of the fluid. A fluid density of the fluid is utilized to convert the volumetric flow rate to the mass flow rate. The fluid density varies with respective concentrations of components of the fluid. For example, the fluid density of the gases separated from the production fluid varies with (e.g., depends on) a concentration of $CO_2$. Accordingly, determining or estimating a fraction of $CO_2$ as disclosed herein not only indicates the fraction of $CO_2$, but also enables improved estimation of the density of the gases and the mass flow rate.

Embodiments described hereinabove include practical options for long term installation of flowmeters even in harsh environments, whether topside, subsea or even outside of the oilfield. This is particularly advantageous for subsea applications given the extreme challenges involved in change-out of subsea flowmeters. However, even at surface or anywhere else, the availability of a near permanently installed reliable flowmeter is advantageous. This is particularly true where gas fluid flow velocity is to be detected given the lack of practical suitable alternatives to ultrasonic flowmeters.

The preceding description has been presented with reference to presently preferred embodiments. However, other embodiments and/or features of the embodiments disclosed but not detailed hereinabove may be employed. For example, the monolithic nature of the ribbed transducer housing may make it well suited, not only for long-term operations, but also for high temperature applications or where extreme temperature ranges are prone to occur (e.g., from about −46° C. to about 205° C.). Furthermore, persons skilled in the art and technology to which these embodiments pertain will appreciate that still other alterations and changes in the described structures and methods of operation may be practiced without meaningfully departing from the principle and scope of these embodiments. Furthermore, the foregoing description should not be read as pertaining only to the precise structures described and shown in the accompanying drawings, but rather should be read as consistent with and as support for the following claims, which are to have their fullest and fairest scope.

We claim:

1. A system, comprising:
a transducer assembly, the transducer assembly comprising:
a housing comprising a transducer housing portion having a front face and a ribbed housing portion comprising a plurality of attenuating ribs, wherein the plurality of attenuating ribs comprises at least two attenuating ribs differing in both diameter and width; and
a transducer positioned in the housing and configured to direct an emitted acoustic signal through the front face of the housing and to receive a received acoustic signal through the front face of the housing, wherein the transducer housing portion completely surrounds the transducer,
wherein a first attenuating rib of the plurality of attenuating ribs is closest to the transducer housing portion, and the first attenuating rib has a first diameter not larger than a housing diameter of the transducer housing portion.

2. The system of claim 1, wherein the transducer is an ultrasonic transducer configured to direct the emitted acoustic signal with a frequency between about 10 kHz and about 5 MHz.

3. The system of claim 1, wherein the transducer assembly comprises a subsea transducer assembly.

4. The system of claim 1, wherein the housing comprises a channel that supports conductors that carry signals from the transducer, and each of the plurality of attenuating ribs circumferentially surrounds the channel.

5. The system of claim 1, wherein the first attenuating rib is configured to attenuate a majority of acoustic energy propagated from the transducer and through the housing.

6. The system of claim 1, comprising a meter body and at least one metal seal element configured to provide a seal between the meter body and the housing of the transducer assembly.

7. The system of claim 1, comprising a meter body, wherein the meter body and the housing of the transducer are welded, brazed, or otherwise joined to one another to form a sealed joint between the meter body and the housing of the transducer assembly.

8. The system of claim 1, comprising:

a production well configured to produce production fluids from a formation;

a separation station configured to separate the production fluids into a liquid export and a gas; and an injection station comprising a pump configured to pump the gas through an injection well to return the gas to the formation, wherein the transducer assembly is positioned between the separation station and the injection well along a direction of flow of the gas.

9. The system of claim 1, wherein the housing is a monolithic housing having the transducer housing portion and the ribbed housing portion.

10. The system of claim 1, wherein the plurality of attenuating ribs comprises at least three attenuating ribs differing in both diameter and width.

11. The system of claim 1, wherein a second attenuating rib follows the first attenuating rib in a sequence of the plurality of attenuating ribs, and the second attenuating rib has a second diameter smaller than the first diameter.

12. The system of claim 11, wherein the second attenuating rib has a second width smaller than a first width of the first attenuating rib.

13. The system of claim 11, wherein a third attenuating rib follows the second attenuating rib in the sequence of the plurality of attenuating ribs, and the third attenuating rib has a third diameter larger than the second diameter.

14. The system of claim 13, wherein the first attenuating rib has a first width, the second attenuating rib has a second width, and the third attenuating rib has a third width, wherein the second width is sized in between the first and third widths.

15. The system of claim 13, wherein a fourth attenuating rib follows the third attenuating rib in the sequence of the plurality of attenuating ribs, and the fourth attenuating rib has a fourth diameter larger than the third diameter.

* * * * *